US008863626B2

(12) United States Patent
Matsumura

(10) Patent No.: US 8,863,626 B2
(45) Date of Patent: Oct. 21, 2014

(54) NIBBLER ASSEMBLY FOR PUNCH PRESS AND METHOD OF FORMING ELONGATED HOLE IN SHEET MATERIAL

(75) Inventor: Kohei Matsumura, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 283 days.

(21) Appl. No.: 13/495,562

(22) Filed: Jun. 13, 2012

(65) Prior Publication Data

US 2013/0000456 A1    Jan. 3, 2013

(30) Foreign Application Priority Data

Jun. 28, 2011  (JP) ................................. 2011-142536

(51) Int. Cl.
*B21D 28/00*  (2006.01)
*B21D 28/16*  (2006.01)
*B23D 27/00*  (2006.01)

(52) U.S. Cl.
CPC ............... *B23D 27/00* (2013.01); *B21D 28/16* (2013.01)
USPC .................................. 83/49; 83/636; 83/689

(58) Field of Classification Search
USPC ............... 83/35, 36, 39, 49, 52, 56, 636, 682, 83/684, 689, 916, 917, 237, 530
See application file for complete search history.

(56) References Cited

U.S. PATENT DOCUMENTS

| 4,674,373 | A | * | 6/1987 | Kuppinger | ........................ 83/49 |
| 4,981,058 | A | * | 1/1991 | Gavrun, III | ........................ 83/34 |
| 6,427,512 | B2 | * | 8/2002 | Suzuki et al. | .................... 72/337 |
| 6,868,763 | B2 | * | 3/2005 | Graf | ................................ 83/49 |

FOREIGN PATENT DOCUMENTS

| JP | 56-165532 A | 12/1981 |
| JP | 0523998 A | * 2/1993 |
| JP | 07-265967 A | 10/1995 |
| JP | 07-275964 A | 10/1995 |
| JP | 2003-230920 A | 8/2003 |
| JP | 2005-238324 A | 9/2005 |
| JP | 2009-113051 A | 5/2009 |

OTHER PUBLICATIONS

Official Communication issued in corresponding European Patent Application No. 12171705.2, mailed on Oct. 23, 2012.

* cited by examiner

*Primary Examiner* — Stephen Choi
(74) *Attorney, Agent, or Firm* — Keating & Bennett, LLP

(57) ABSTRACT

A nibbler assembly includes a punch and a die. The die includes a through opening formed therein, which opening has an oblong configuration as viewed along a vertical direction. The die includes an upper surface including a recess extending from an upper peripheral portion of the through opening at an upstream side of a feed direction towards the upstream of the feed direction. The recess is dented downwardly relative to other portions of the upper surface. The punch includes a blade substantially matching in shape with the through opening. The blade includes an upstream end portion in the feed direction provided with opposite corners each having an arcuate shape as viewed along the vertical direction. The punch and the die are operable to punch successive holes that at least partially overlap along the feed direction so as to form an elongated hole in a sheet material.

3 Claims, 9 Drawing Sheets

DOWNSTREAM SIDE ← FEED DIRECTION A — UPSTREAM SIDE

Fig. 12A
Fig. 12B
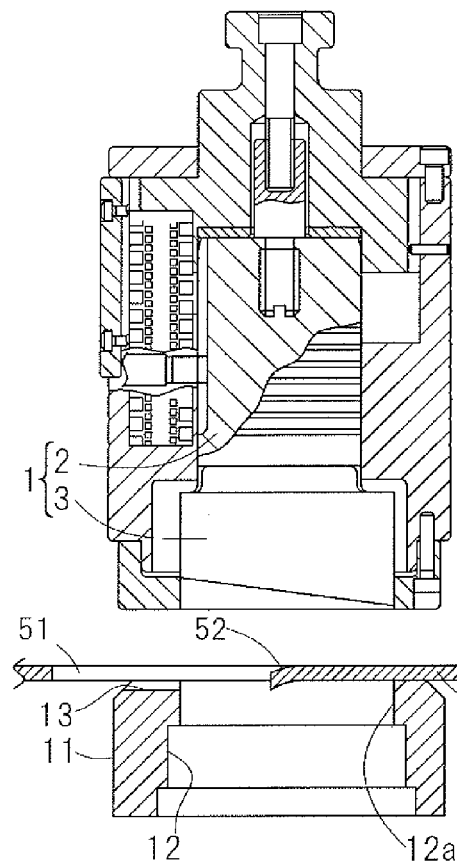
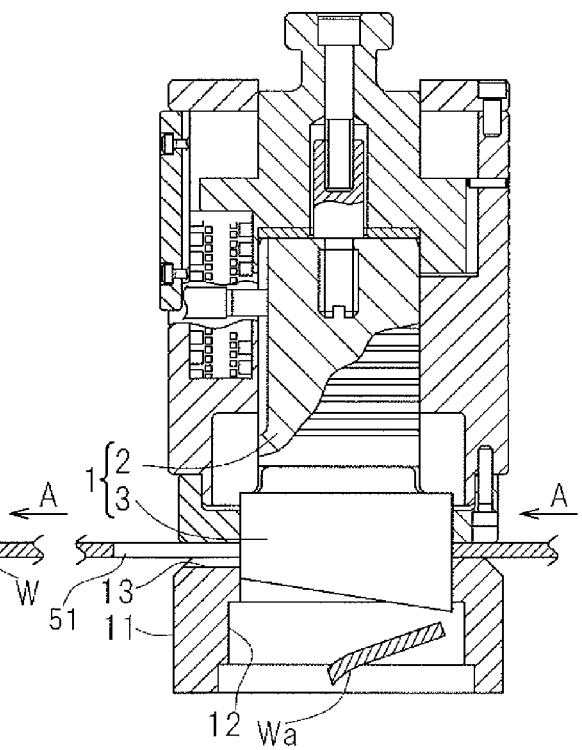
Fig. 13
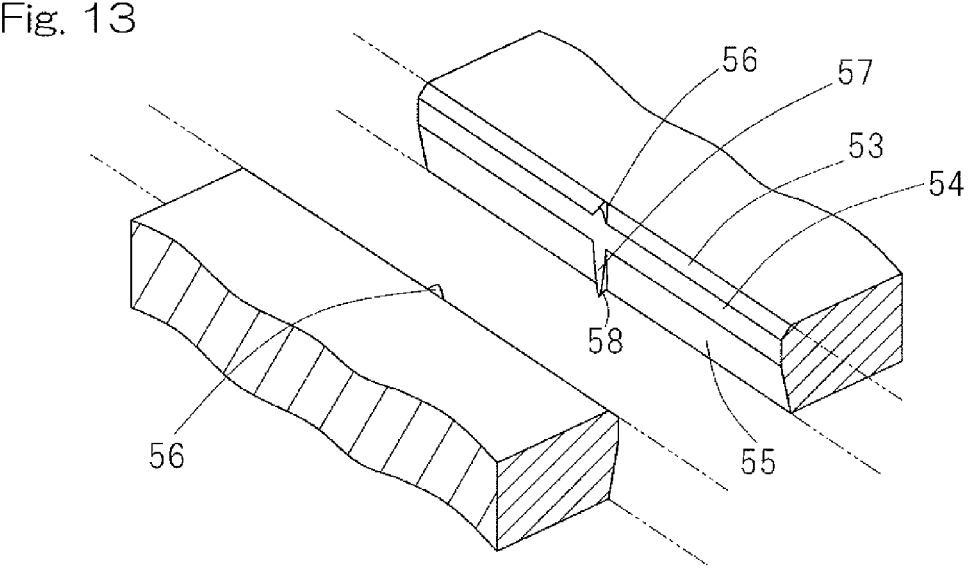
PRIOR ART

NIBBLER ASSEMBLY FOR PUNCH PRESS AND METHOD OF FORMING ELONGATED HOLE IN SHEET MATERIAL

CROSS REFERENCE TO THE RELATED APPLICATION

This application is based on and claims convention priority to Japanese patent application No. 2011-142536, filed Jun. 28, 2011, the entire disclosure of which is herein incorporated by reference as a part of this application.

BACKGROUND OF THE INVENTION

1. Field of the Invention

The present invention relates to a nibbler assembly for a punch press to perform a nibbling operation performed on a sheet material, a method of forming an elongated hole in the sheet material with such a nibbler assembly, and a punch for a punch press to perform a nibbling operation to the sheet material.

2. Description of the Related Art

In a nibbling operation performed on a sheet material with a punch press, a conventional process may include the use of a die and a punch to punch a plurality of successive holes that at least partially overlap with each other. The die may include a through opening formed therein and having an oblong configuration. Such a conventional process may leave a seam-like portion at one end of the overlap between the successive holes, which may deteriorate an appearance or may cause an uncomfortable touch. Such a seam-like portion consists of the following components as shown in FIG. 13.

Assuming that a punch of a laterally rectangular configuration is used to punch a hole 51, a roll-over or shear droop may not be formed at the upper end edge 51aa of the corner 51a of the punched hole 51, as shown in FIG. 14. This results in the formation of a seam-like segment 56 on a roll-over surface 53. More specifically, the upper end edge 51aa of the corner 51a with no roll-over leaves a projection when the next hole 51 is punched. It has been discovered that the absence of roll-over at the upper end edge 51aa of the corner 51a is caused by the greater distance between a punch 1 and the punched hole 51 at the corner 51a than the distance C at other locations (B>C), as is illustrated in FIG. 15. This greater distance at the corner 51a makes it difficult to impart the punching force of the punch 1 to a sheet material W.

Also, at the corner 51a of the punched hole 51, the punched surface is not made of a fractured surface. Instead, as shown in FIG. 14, a burnished or sheared surface segment 54a continues to the lower end of the punched surface, causing the formation of a protrusion 57 on the punched surface. Note that the fractured surface 55 is depressed with respect to a sheared surface 54, as is illustrated in FIG. 16. Therefore, of the sheared surface segment 54a left in the previously punched hole 51, the portion that extends to the lower end remains in the form of a projection protruding from the surrounding fractured surfaces, when the next hole 51 is punched.

Moreover, since at the corner 51a of the punched hole 51 previously punched in the sheet material W, the sheared surface segment 54a (FIG. 14) extends to the lower end of the sheet material W, the sheared surface segment 54a is rubbed and stretched downwardly by a side surface of the punch 1 when it punches the next hole 51. This results in the formation of a prong 58 that protrudes from the bottom surface of the sheet material W. The prong 58 is a burr of a larger size.

Conventionally, these seam-like segments are manually treated, for example, with a sander or a file. Manual treatments not only lead to a variation in the finishing quality due to the skill of attendant workers but also involve more process steps, thereby lowering the process efficiency.

In order to eliminate the formation of such seam-like segments of various kinds or make them as invisible as possible, a punching technique has been proposed which uses a nibbler assembly with a cutter blade section having a bottom surface slant with respect to a horizontal axis. The slant cutter blade section is not configured to punch a complete hole in a sheet material, but is only configured to make small slits that facilitate a complete cutting in the next punching stroke (see, for example, Japanese Patent No. 3401908 and Japanese Patent No. 3960066). Japanese Patent No. 4518539 proposes a punching technique which makes successive half-cuts in a workpiece at a predetermined interval and subsequently makes a complete cut in a portion of the workpiece extending between the neighboring half-cut points, in order to eliminate seam-like portions. Japanese Examined Patent Publication No. S61-009895 describes a punch with a side edge having an arcuate shape in order to perform a nibbling operation in such a way that the arcuate shape portion of the punch overlaps with the portion of a previously formed hole which does not contain any arcuate shapes, in order to make seam-like segments on a roll-over surface less visible.

The above proposed techniques enable the formation of roll-over or shear droop and fractured surfaces at each corner of a punched hole, just as in other locations of the punched hole. With such techniques, a nibbling operation to form successive holes with a partial overlap with each other allows for aesthetic finishing of the overlapped portion between successive holes, resulting in smooth and continuous surface textures. However, the kind of punch used in these techniques has a complex shape and is accordingly expensive. Also, since the sheet material is not punched out by the slant cutter blade section, a hole that can be punched per stroke is of a limited length and accordingly, the process efficiency is low. Furthermore, complicated control must be implemented to assure a fine adjustment of the stroke length of the punch.

SUMMARY OF THE INVENTION

Preferred embodiments of the present invention provide an inexpensive nibbler assembly for a punch press that can perform a nibbling operation with more efficiency and can perform smooth finishing of the overlaps between successive punched holes.

A nibbler assembly for a punch press is operable to punch in a sheet material successive holes that at least partially overlap with each other along a feed direction in which the sheet material is fed from an upstream to a downstream thereof so as to form an elongated hole in the sheet material. The nibbler assembly includes a die that includes a through opening formed therein. The through opening preferably has an oblong configuration as viewed along a vertical direction or in a plan view. The die has an upper surface including a recess extending from an upper peripheral portion of the through opening at an upstream side of the feed direction towards the upstream of the feed direction, and the recess is dented downwardly relative to other portions of the upper surface. The nibbler assembly also includes a punch that includes a blade substantially matching in shape with the through opening and configured to enter the through opening. The blade includes an upstream end portion in the feed direction provided with opposite corners each having an arcuate shape as viewed along the vertical direction.

With such a nibbler assembly, the sheet material is positioned on the die such that the sheet material extends in a horizontal direction and the punch is lowered against the sheet material to perform a punching operation. In this way, a hole of an oblong shape, such as a rectangular or substantially rectangular shape, for example, is punched in the sheet material, with the shape matching with the die and the punch as viewed along the vertical direction.

As discussed above, the die includes an upper surface including a recess extending from an upper peripheral portion of the through opening at an upstream side of the feed direction towards the upstream of the feed direction, and the recess is dented downwardly relative to other portions of the upper surface. As a result, the portion of the sheet material that is adjacent the edge of the punched hole, which, in turn, is more proximal to the upstream of the feed direction, is deformed downwardly by an amount corresponding to the depth of the recess to provide a processed portion.

Also, as discussed above, the punch includes the blade including an upstream end portion in the feed direction provided with opposite corners each having an arcuate shape as viewed along the vertical direction. Therefore, the distance between the punch and the punched hole at the corners of the punched hole is substantially the same as at other locations. As a result, a roll-over or shear droop surface can be formed at the corners of the punched hole.

The seam-like portion formed on the shear droop surface can be minimized when performing a nibbling operation of punching in the sheet material successive holes that at least partially have an overlap with each other. This advantage is derived by the combination of the following two effects. Firstly, the portion of the sheet material that is adjacent the edge of a previously punched hole, which, in turn, is more proximal to the upstream of the feed direction, is rendered to be the processed portion that is deformed downwardly. Secondly, the shear droop surface is formed at the corners of the previously punched hole, which corners are more proximal to the upstream of the feed direction. Also, since a fracture surface is formed at each corner of the previous punched hole, no burnished or sheared surface, when the next hole is punched, remains at the lower portion of the sheared surface, thereby not forming the aforementioned type of protrusion on the sheared surface. Furthermore, since such a fracture surface is formed at each corner of the previously punched hole, even when the fracture surface is rubbed and stretched downwardly by a side surface of the punch during punching process, an amount of protrusion from the bottom surface of the sheet material is limited. As a result, a protrusion or prong protruding from the bottom surface of the sheet material can be minimized.

The recess of the die and the arcuate shape corners of the blade of the punch are formed only on the upstream side of the feed direction. Therefore, by positioning the die and the punch such that the orientations thereof are reversed along the feed direction and then carrying out punching using the die and punch, the edge of the punched hole that is adjacent to the upstream of the feed direction preferably has an oblong shape, for example, a rectangular or substantially rectangular shape, as viewed along the vertical direction which is similar to the shape of the punched hole on the downstream side of the feed direction. In this way, the elongated hole can be formed with a single nibbler assembly.

In a nibbling operation using this nibbler assembly, a smaller overlap margin can be achieved between the successive holes along the feed direction, compared with a conventional nibbler assembly having the slant cutter blade mentioned above, thereby resulting in improved process efficiency. Also, the nibbler assembly of the present preferred embodiment, as compared with those described in Japanese Patent No. 3401908 and Japanese Patent No. 3960066, has a simplified construction and can be manufactured with low cost.

In a preferred embodiment of the present invention, the punch may include a segment corresponding to the overlap between the successive holes and the segment may have a shape such that a width dimension in a direction perpendicular to the feed direction decreases towards the downstream of the feed direction.

With such a construction, the cut surface of the corner of a previously punched hole will not be rubbed and stretched downwardly by a side surface of the punch. Therefore, the protrusion from the bottom surface of the sheet material can be further minimized.

According to another preferred embodiment of the present invention, a method of forming an elongated hole in a sheet material includes the step of providing a die and a punch, the die including a through opening formed therein, the through opening having an oblong configuration as viewed along a vertical direction, the die including an upper surface formed with a recess extending from an upper peripheral portion of the through opening at an upstream side of the feed direction towards the upstream of the feed direction, the recess being dented downwardly relative to other portions of the upper surface, the punch including a blade substantially matching in shape with the through opening and configured to enter the through opening, the blade including an upstream end portion in the feed direction provided with opposite corners each having an arcuate shape as viewed along the vertical direction. The method further includes the step of driving the punch to punch in the sheet material successive holes such that the successive holes at least partially with each other along the feed direction, thereby to perform a nibbling operation that forms the elongated hole in the sheet material.

Such a method has the same advantages that can be achieved by a nibbling operation with the aforementioned nibbler assembly according to the preferred embodiment of the present invention described above.

A preferred embodiment of the present invention provides a punch usable in combination with a die to punch in a sheet material successive holes that at least partially overlap with each other along a feed direction in which the sheet material is fed from an upstream to a downstream thereof, to perform a nibbling operation that forms an elongated hole in the sheet material, in which the die includes a through opening formed therein and the through opening has an oblong configuration as viewed along a vertical direction. The punch includes a blade substantially matching in shape with the through opening and configured to enter the through opening. The blade includes an upstream end portion in the feed direction provided with opposite corners each having an arcuate shape as viewed along the vertical direction.

For example, such a punch may be used to carry out a nibbling operation in combination with a die that includes a through opening, with the through opening of an oblong configuration as viewed along the vertical direction. In such a case, the same advantages as the nibbling operation with the nibbler assembly according to the above-described preferred embodiment of the present invention can be achieved.

The present invention encompasses any combination of at least two features disclosed in the specification and/or the drawings, and recited in the claims. In particular, the present invention encompasses any combination of at least two features recited in the claims.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12A is a longitudinal cross sectional view showing the mount system at a stage before the finishing punching stroke is applied to a sheet material, in the course of forming the elongated hole in the sheet material.

FIG. 12B is a longitudinal cross sectional view showing the mount system at a stage after the finishing punching stroke is applied to the sheet material, in the course of forming the elongated hole in the sheet material.

FIG. 13 is a perspective view showing a cut surface of a hole punched with a conventional nibbler assembly.

DETAILED DESCRIPTION OF THE PREFERRED EMBODIMENTS

Preferred embodiments of the present invention will be described in connection with the drawings.

Figure 1:
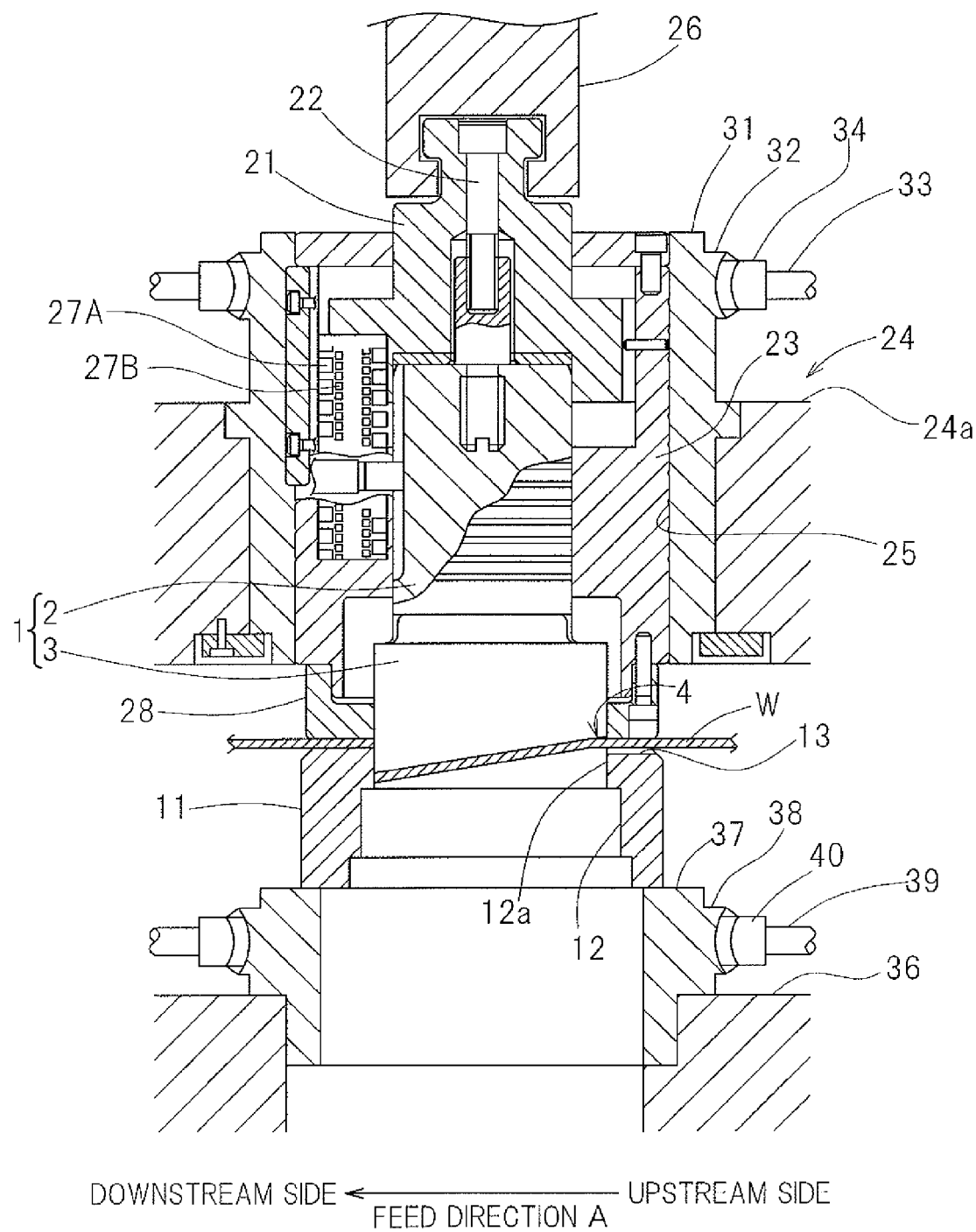
FIG. 1 is a longitudinal cross sectional view showing a mount system of a punch press to which a nibbler assembly according to a first preferred embodiment of the present invention is mounted.

FIG. 1 shows amount system of a punch press to which a nibbler assembly according to a first preferred embodiment of the present invention is mounted. The nibbler assembly includes a punch 1 and a die 11, and a punching operation is carried out by positioning a sheet material Won the die 11 such that the sheet material W extends in a horizontal plane and then lowering the punch 1 against the sheet material W.

Figure 2A:
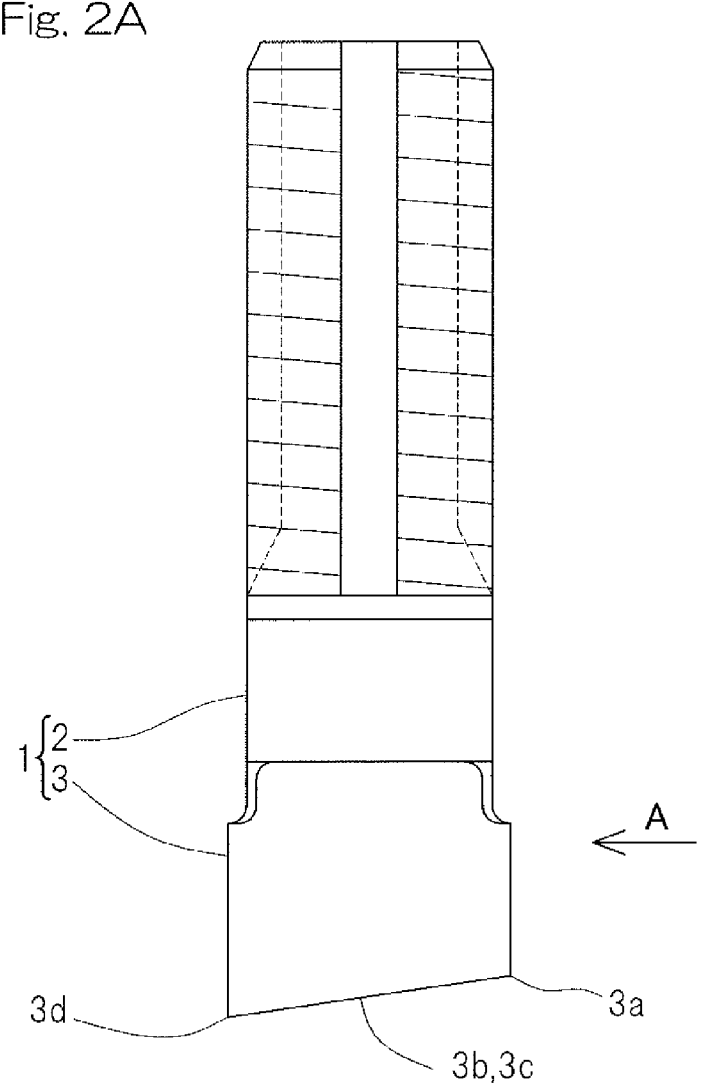
FIG. 2A is a front elevational view showing a punch of the nibbler assembly of FIG. 1.
Figure 2B:
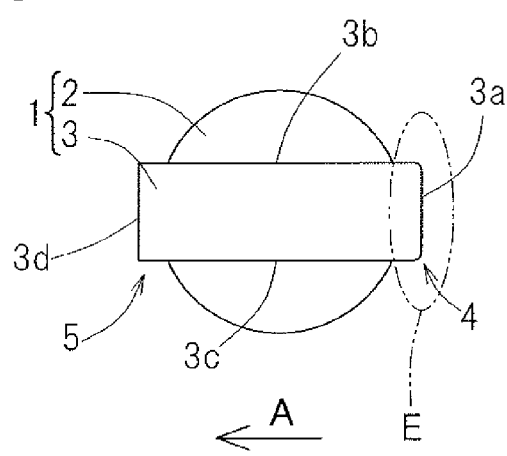
FIG. 2B is a bottom plan view of a punch of the nibbler assembly of FIG. 2A.

As shown in FIG. 2A and FIG. 2B, the punch 1 includes a haft 2 and a blade 3 provided at a lower end of the haft 2. The blade 3 preferably is oblong, for example, rectangular or substantially rectangular, in a cross sectional shape thereof, and includes a bottom surface that is inclined upwardly towards the upstream (the right side of FIG. 2A) of a feed direction A in which the sheet material W is fed. The bottom surface of the blade 3 has a constant height level with respect to a direction perpendicular or substantially perpendicular to the feed direction A (i.e., a direction perpendicular or substantially perpendicular to the surface plane of the paper of FIG. 2A). The bottom surface of the blade 3 includes four sides defining respective punch edges 3a, 3b, 3c, 3d which cooperate with the die edges 12aa, 12ab, 12ac, 12ad (which will be described in detail later), respectively, of the die 11 to punch the sheet material W. In FIG. 2A and FIG. 2B, the punch 1 is oriented to perform a nibbling operation.

Figure 3A:
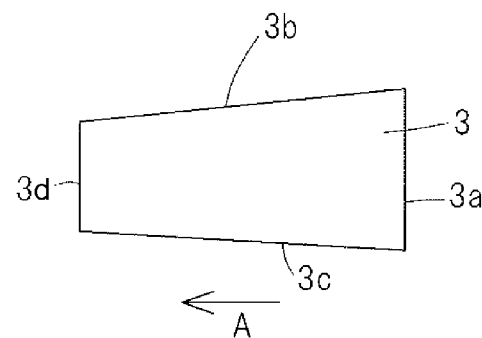
FIG. 3A is a schematic view showing the shape of the bottom surface of a blade of the punch.
Figure 3B:
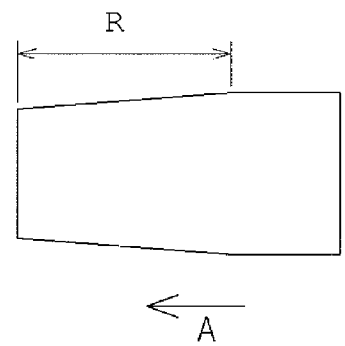
FIG. 3B is a bottom plan view showing the shape of the bottom surface of the blade of the punch, which shape is different from the one illustrated in FIG. 3A.

In detail, the blade 3 has a lateral cross sectional shape in which a dimension in a width direction perpendicular or substantially perpendicular to the feed direction A is gradually decreasing towards the downstream of the feed direction A. In other words, the blade 3 may have a lateral cross sectional shape that is not of an exact rectangle but of a trapezoid or a trapezium as shown in FIG. 3A. Nevertheless, the lateral cross sectional shape of the blade 3 may as well be said to be oblong or substantially rectangular, since the change of the dimension in the width direction is quite small. Although, in FIG. 3A the dimension in the width direction of the blade 3 decreases over the entire shape thereof along the feed direction A, as shown in FIG. 3B, only a partial segment or range R of the blade 3 defining the overlapped portion between the successive punched holes may have a shape in which the dimension in the width direction perpendicular or substantially perpendicular to the feed direction A is gradually decreasing towards the downstream of the feed direction A.

Figure 2C:
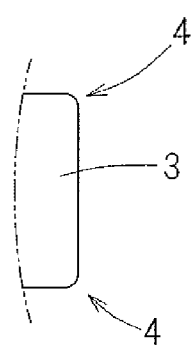
FIG. 2C is a fragmentary enlarged view of FIG. 2B.

As shown in FIG. 2C illustrating a fragmentary enlarged view of the ellipse E of FIG. 2B, the blade 3 includes an upstream end portion in the feed direction A provided with opposite arcuate corners 4, each having an arcuate shape as viewed in a plan view (e.g., as viewed along a vertical direction that is substantially perpendicular to the feed direction A.). The blade 3 includes a downstream end portion in the feed direction A provided with opposite square corners 5, each having a right angle shape as viewed in the plan view.

Figure 4A:
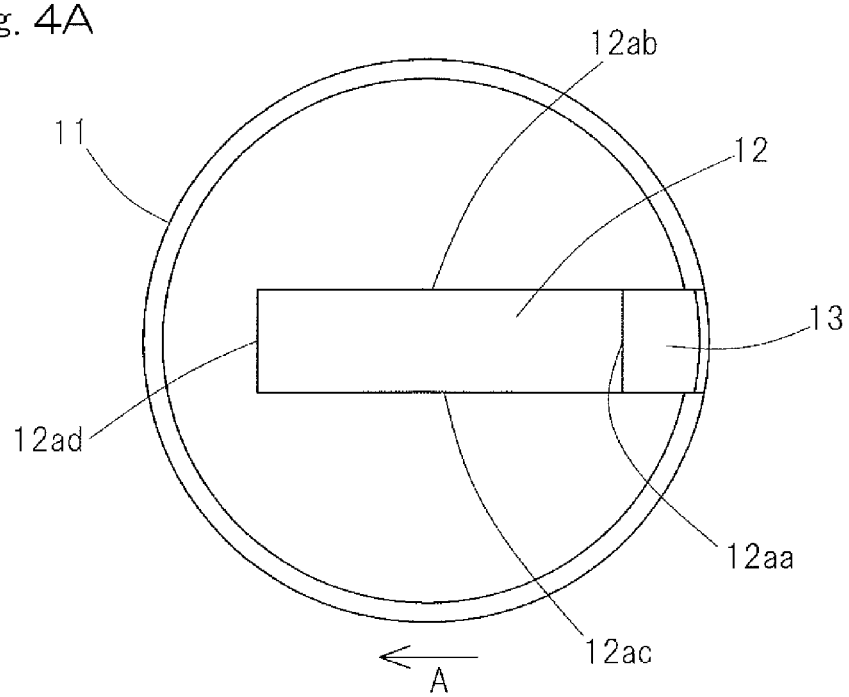
FIG. 4A is a top plan view showing a die of the nibbler assembly of FIG. 1.
Figure 4B:
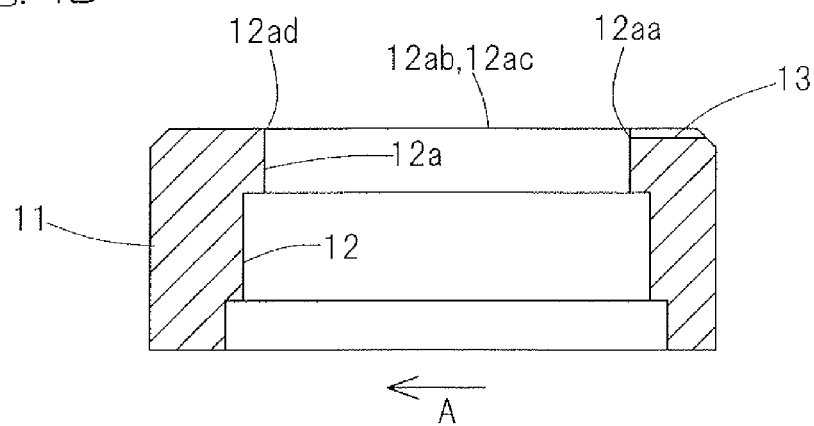
FIG. 4B is a cutaway front elevational view of the die of FIG. 4A.

As shown in FIG. 4A and FIG. 4B, the die 11 includes a die body having a shape of substantially circular as viewed in the plan view and a through opening 12 formed in the die body and extending through the die body from a top to a bottom thereof. The through opening 12 preferably has an oblong configuration, for example, such as a rectangular or substantially rectangular configuration, as viewed in the plan view so that the blade 3 of the punch 1 enters the through opening 12. In the illustrated example, the through opening 12 preferably is in the form of a slit. As shown in FIG. 4B, the through opening 12 is a stepped opening that is elongated in the feed direction A and includes an upper opening portion 12a of a configuration having a lateral cross section that substantially matches in shape with the blade 3 of the punch 1. The upper opening portion 12a includes four sides defining the aforementioned die edges 12aa, 12ab, 12ac, 12ad that engage with the punch edges 3a, 3b, 3c, 3d, respectively, of the punch 1. The die 11 includes an upper surface formed with a recess 13 extending from an upper peripheral portion of the through opening 12 at an upstream side of the feed direction A towards the upstream of the feed direction A, and the recess 13 is dented downwardly than other portions of the upper surface.

As shown in FIG. 1, the punch 1 and the die 11 of the nibbler assembly are mounted to the mount system of the punch press for operation. The punch 1 is secured to a head member 21 via a set bolt 22, and is mounted for up and down movement via a punch holder 23 in a punch mount hole 25 of an upper turret 24 of the punch press. The head member 21 includes a T-shaped head that engages with a ram 26 of a punch drive mechanism (not shown) of the punch press, and is driven to move up and down by the mechanism. The punch drive mechanism may be a crank mechanism or a hydraulic mechanism. The punch holder 23 is movably arranged with respect to the upper turret 24 in an up and down direction and is urged downwardly by a set of holding springs 27A, 27B. The punch holder 23 includes a lower end fixedly provided with a stripper plate 28.

The punch 1 defines an indexable tool that can adjust an angular position thereof. In particular, the punch mount hole 25 is formed in a rotary member 31 that is rotatable relative to a turret body 24a of the upper turret 24. The rotary member 31 includes an outer peripheral surface provided with a worm wheel 32 engageable with a worm gear 34 provided in a rotational shaft 33 extending radially of the turret 24 or radially of the punch mount hole 25. Rotation of the rotational shaft 33 by a drive mechanism is transmitted to the rotary member 31 via the worm gear 34 and the worm wheel 32, to index the punch 1 to the desired angular position.

Likewise, the die 11 defines an indexable tool that can adjust an angular position thereof. In particular, a die holder 37 that holds the die 11 is rotatably mounted to a lower turret 36 of the punch press. The die holder 37 includes an outer peripheral surface provided with a worm wheel 38 engageable with a worm gear 40 provided in a rotational shaft 39 extending radially of the lower turret 36 or radially of the die 11. Rotation of the rotational shaft 39 by a drive mechanism is transmitted to the die holder 37 via the worm gear 40 and the worm wheel 38, to index the die 11 to the desired angular position.

Each of the upper and lower turrets 24, 36 is a die support member that supports various kinds of tools to perform a punching operation at a plurality of circumferential locations thereof, and in the illustrated example, as one of such tools the punch 1 and the die 11 are mounted to the upper and lower turrets 24, 36 for the nibbler assembly, respectively. A punch (not shown) and a die (not shown) for use other than in a nibbler assembly, may be mounted to the upper and lower turrets 24, 36, respectively, in a configuration indexable to a desired angular position. A punch press including such a nibbler assembly may necessarily not be a turret punch press, and the punch and the die may be mounted to a die support member which is not a turret-type.

Figure 5A:
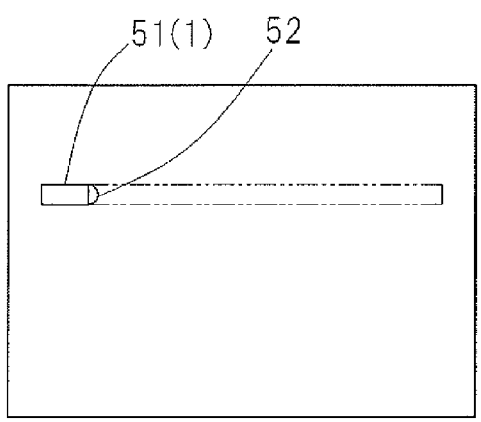
FIGS. 5A to 5D show an example of the process steps informing an elongated hole in a sheet material with the nibbler assembly.
Figure 5B:
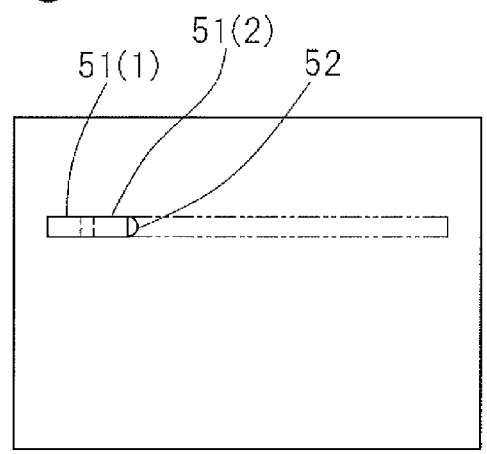
Figure 5C:
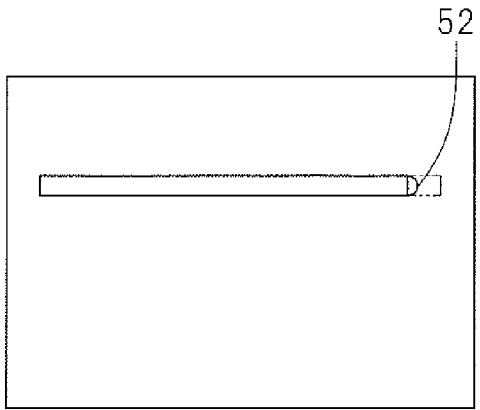
Figure 5D:
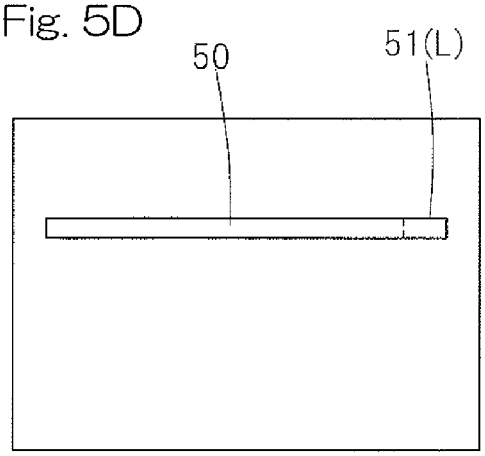

The punching operation with the nibbler assembly that includes the punch 1 and the die 11 will be described below, in which an elongated hole 50 such as shown in FIG. 5D is to be formed in the sheet material W. In general, successive holes 51 are punched in the sheet material W such that the successive holes 51 at least partially have an overlap with each other along the feed direction A.

Figure 6A:
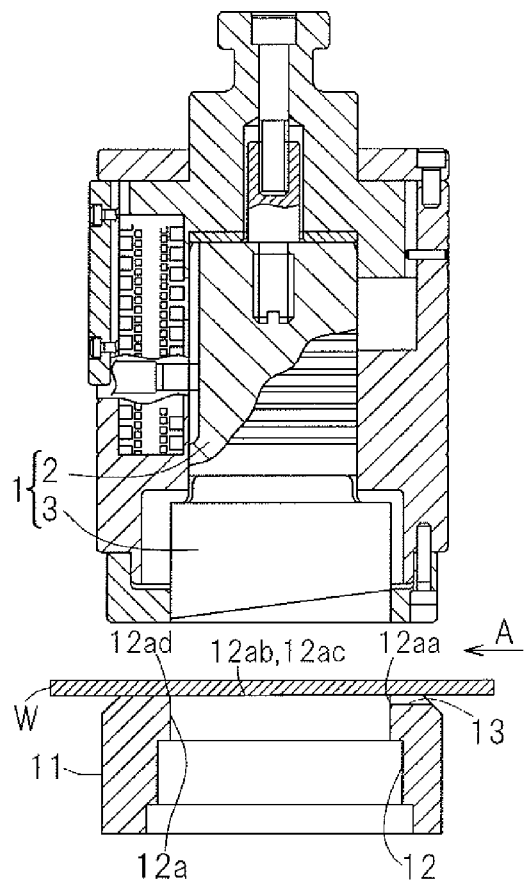
FIG. 6A is a longitudinal cross sectional view showing the mount system at a stage before a first punching stroke is applied to the sheet material, in the course of forming the elongated hole in the sheet material.
Figure 6B:
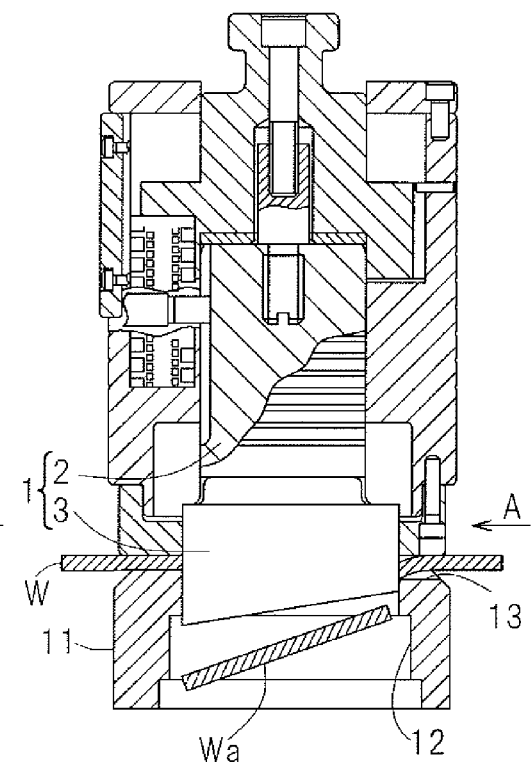
FIG. 6B is a longitudinal cross sectional view showing the mount system at a stage after the first punching stroke is applied to the sheet material, in the course of forming the elongated hole in the sheet material.

FIG. 6A and FIG. 6B illustrate a first punching stroke. As shown in FIG. 6A, the sheet material W is positioned with respect to the punch 1 and the die 11 such that a starting end of the elongated hole 50 to be formed assumes the same position on a plane surface as the punch 1 and the die 11. In particular, a sheet material W is positioned with respect to the punch 1 and the die 11 such that the first hole to be produced by the punch 1 and the die 11 corresponds to the starting end of the elongated hole 50 to be formed. With the sheet material W being kept in the position, the punch 1 is lowered against the sheet material W as shown in FIG. 6B, to punch a hole 51(1) such as shown in FIG. 5A. A punched piece Wa punched out from the sheet material W falls through the through opening 12 of the die 11.

Figure 7:
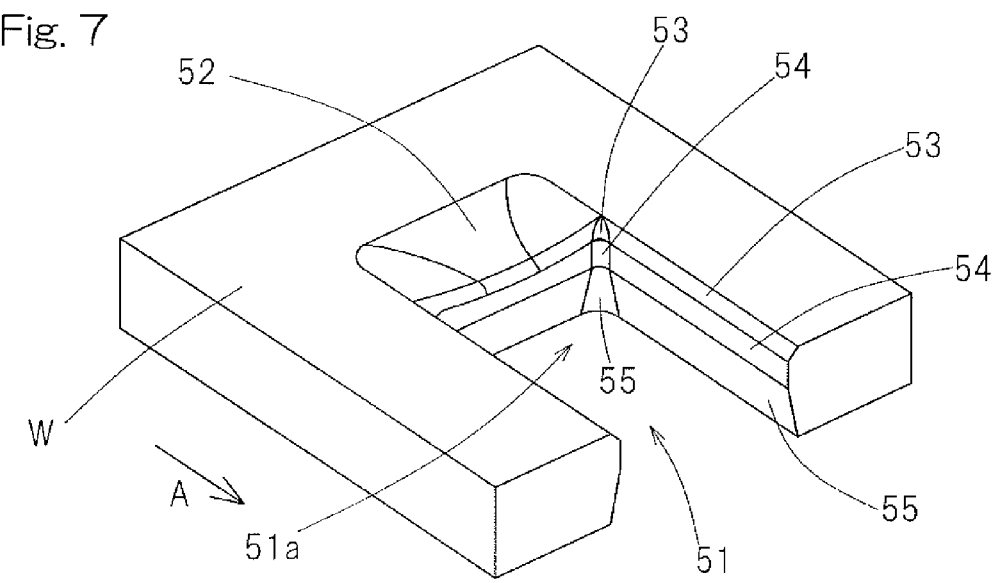
FIG. 7 is a perspective view showing a corner of a punched hole with the nibbler assembly.

Since the die 11 includes the upper surface provided with the recess 13, the die edge 12aa which is the most proximal to the upstream in the feed direction A of the die 11 has a height smaller than those of other die edges 12ab, 12ac, 12ad. As a result, when the sheet material W is punched through with the punch 1, the portion of the sheet material W that is adjacent the end of the punched hole 51 which, in turn, is more proximal to the upstream of the feed direction A becomes a processed portion 52 deformed downwardly by an amount corresponding to the depth of the recess 13 of the die 11 such as shown in FIG. 7.

Figure 8:
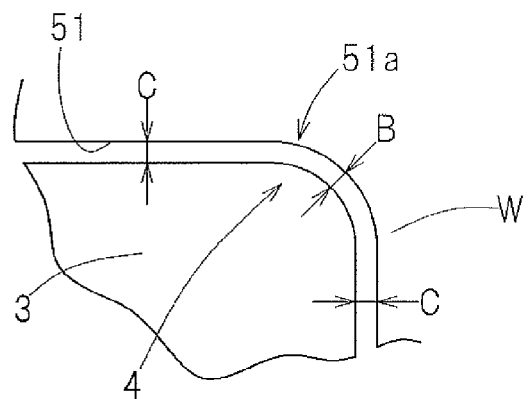
FIG. 8 is a top plan view showing a relative positional relationship between the punch and an upper end edge of a hole punched with the nibbler assembly.

Since the blade 3 of the punch 1 includes the upstream end portion in the feed direction A provided with the arcuate corners 4, each of the arcuate corners 4 having an arcuate shape as viewed in a plan view, as shown in FIG. 8, the distance B at the arcuate corner 4 between the punch 1 and the upper end edge of the punched hole 51 is substantially the same as the distance C at other locations, that define straight lines, between the punch 1 and the upper end edge of the punched hole 51. Therefore, a shear droop surface 53 as well as a fracture surface 55 below a sheared surface 54 can be formed at a corner 51a of the punched hole 51, just as at other locations of the punched hole 51, such as shown in FIG. 7.

Figures 9A, 9B:
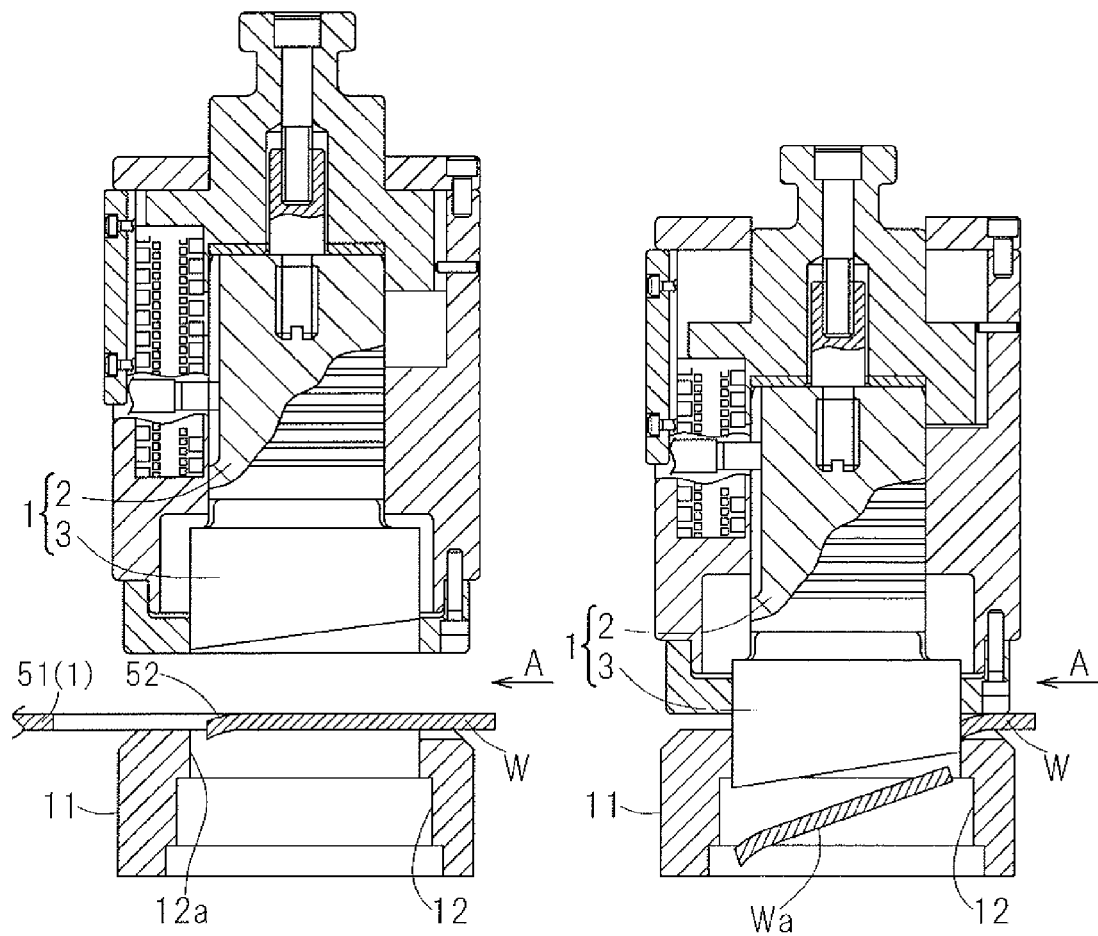
FIG. 9A is a longitudinal cross sectional view showing the mount system at a stage before the second punching stroke is applied to the sheet material, in the course of forming the elongated hole in the sheet material.
FIG. 9B is a longitudinal cross sectional view showing the mount system at a stage after the second punching stroke is applied to the sheet material, in the course of forming the elongated hole in the sheet material.

FIG. 9A and FIG. 9B illustrate a second punching stroke. As shown in FIG. 9A, the sheet material W is positioned with respect to the punch 1 and the die 11 such that the end edge of the punched hole 51(1) made by the first punching stroke, which edge is adjacent the upstream of the feed direction A, overlaps with the punch 1 and the die 11 as viewed in a plan view. With the sheet material W being kept in the position, the die 1 is lowered against the sheet material W as shown in FIG. 9B, to punch a hole 51(2) such as shown in FIG. 5B.

Figure 10:
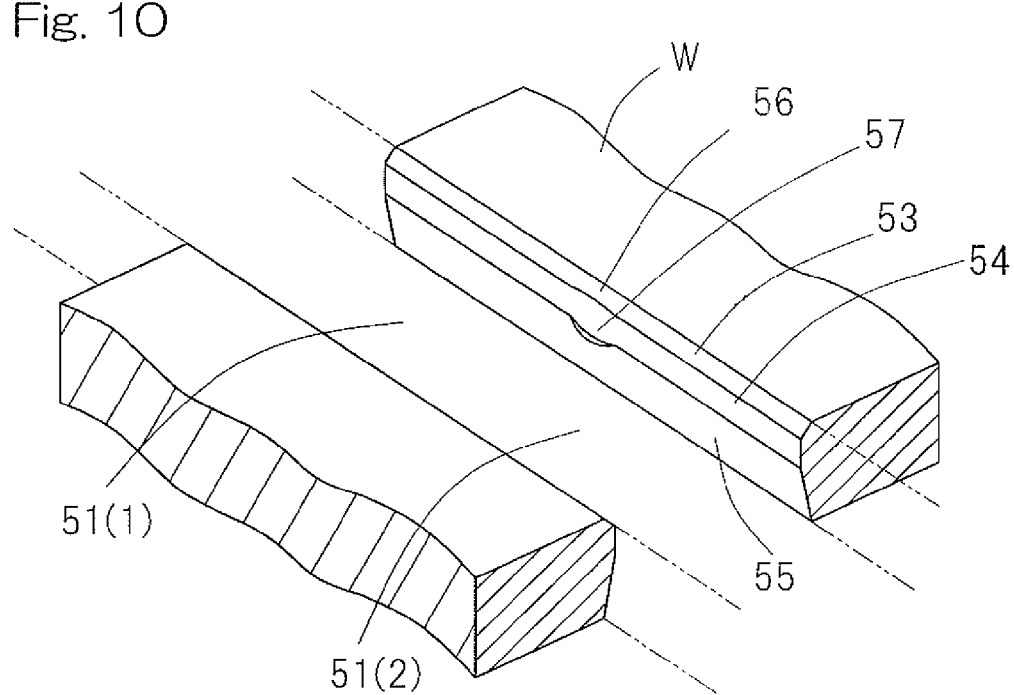
FIG. 10 is a perspective view showing a cut surface of the hole punched with the nibbler assembly.

In this way, a seam-like portion formed at ends of an overlapped portion between successive holes 51(1), 51(2) can be minimized such as shown in FIG. 10 by the combination of the following two effects. Firstly, the portion of the sheet material W that is adjacent to the edge of a punched hole 51(1) by the first punching stroke, which, in turn, is more proximal to the upstream of the feed direction A is rendered to be a processed portion 52 that is deformed downwardly. Secondly, the shear droop surface 53 (such as shown in FIG. 7) is formed at each of the corners 51a of the punched hole 51(1), which corners 51a are more proximal to the upstream of the feed direction A. In particular, the formation of a seam-like segment 56 on the shear droop surface 53 can be minimized. Also, since the fracture surface 55 (such as shown in FIG. 7) can be formed in the lower portion at the corner 51a of the punched hole 51(1), the formation of protrusions 57 in the lower portion of the cut surface can be minimized when the next hole is punched.

Figure 11:
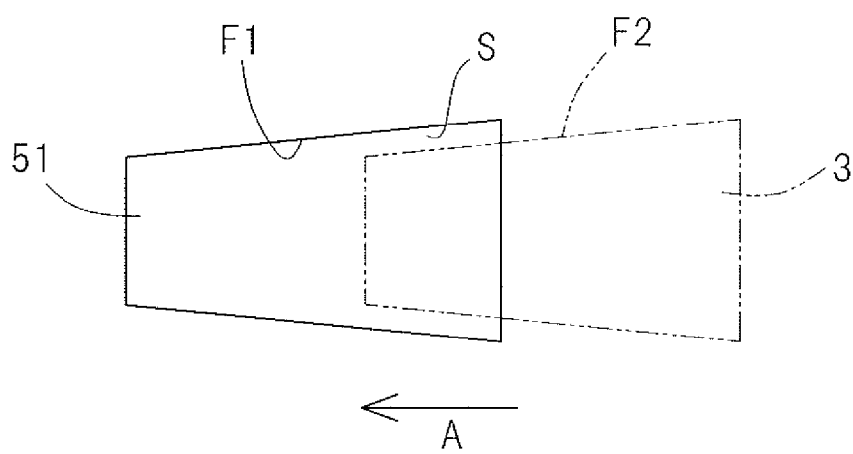
FIG. 11 is a top plan view illustrating a relative plan positional relationship between the punch and the hole punched with the nibbler assembly.
Figure 14:
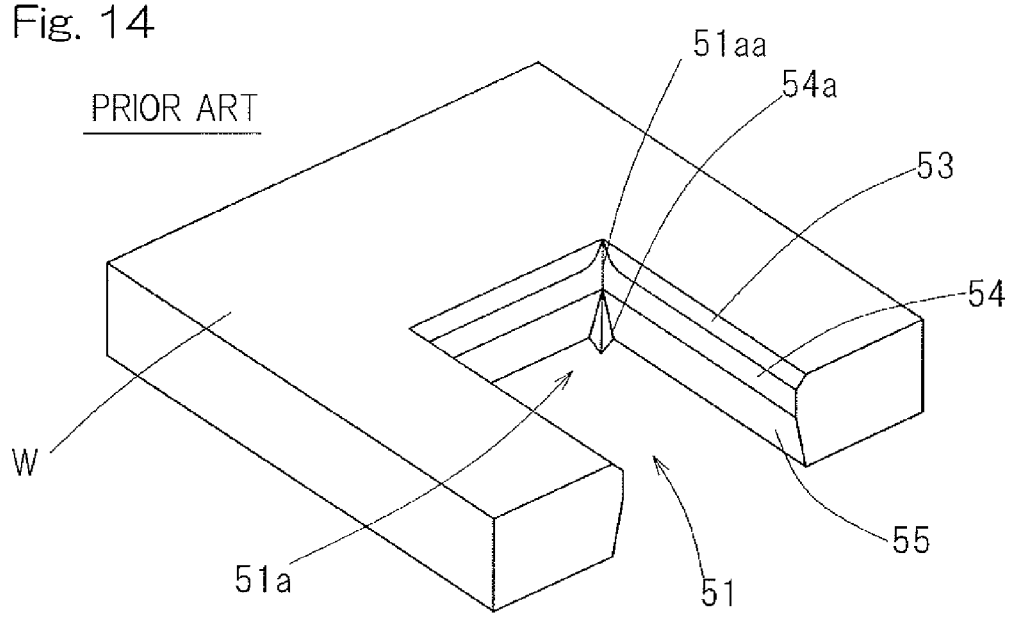
FIG. 14 is a perspective view showing a corner of the hole punched with the conventional nibbler assembly.
Figure 15:
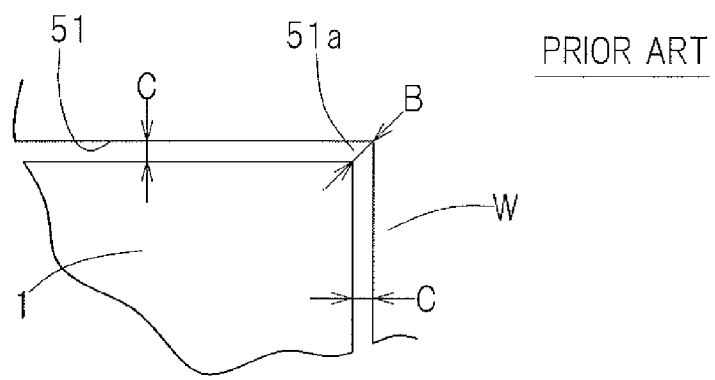
FIG. 15 is a top plan view illustrating a relative positional relationship between a punch of the conventional nibbler assembly and an upper end edge of the hole punched with the conventional nibbler assembly.
Figure 16:
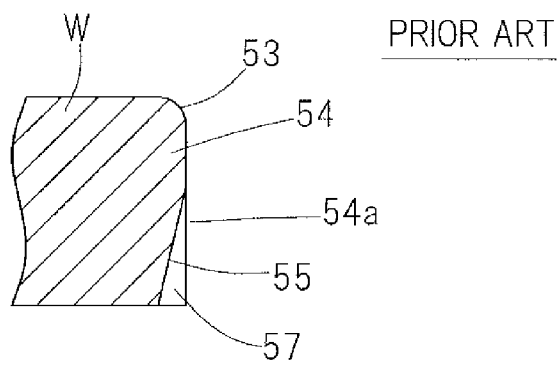
FIG. 16 is a cross sectional view showing the cut surface of the sheet material punched with the conventional nibbler assembly.

Furthermore, since such a fracture surface 55 (such as shown in FIG. 7) is formed at each corner 51a of the punched hole 51(1), even when the sheared surface 54 is rubbed and stretched downwardly by a side surface of the blade 3 of the punch 1 during the second punching stroke, an amount of protrusion from the bottom surface of the sheet material W is limited. In particular, since the blade 3 of the punch 1 has a shape such that the width dimension is gradually decreasing towards the upstream of the feed direction A, in the case of a nibbling operation, a side surface F2 of the blade 3 of the punch 1 is spaced apart from a side wall surface F1 of the previously punched hole 51 by a gap S such as shown in FIG. 11, and accordingly, the side surface F2 of the blade 3 does not contact and rub the side wall surface F1 of the previously punched hole 51. Therefore, the formation of the prong 58 (such as shown in FIG. 13) protruding from the bottom surface of the sheet material W can be minimized.

The aforementioned procedures of the nibbling operation to the sheet material W, in which the successive holes 51 at least partially overlap with each other, is continued until at a stage (FIG. 5C) before the formation of the finishing end of the elongated hole 50 to be formed in the sheet material W. At this stage, the finishing punching stroke is applied to the sheet material W.

FIG. 12A and FIG. 12B illustrate the finishing punching stroke. As shown in FIG. 12A, the orientations of the punch 1 and the die 11 are reversed along the feed direction A. The sheet material W is positioned with respect to the punch 1 and the die 11 such that the finishing end of the elongated hole 50 to be formed assumes the same position as the punch 1 and the die 11 as viewed in the plan view. With the sheet material W being kept in the position, the punch 1 is lowered against the sheet material W as shown in FIG. 12B, to punch a hole 51(L) such as shown in FIG. 5D. Therefore, by positioning the punch 1 and the die 11 such that the orientations thereof are reversed along the feed direction A and then punching the finishing hole 51 (L) in the sheet material W, the end of that finishing hole 51(L) that is adjacent the upstream of the feed direction A preferably will have an oblong shape, for example, a rectangular or substantially rectangular shape, as viewed along the vertical direction, which is similar to the shapes of the ends of the holes punched on the downstream of the feed direction A. In this way, the elongated hole 50 can be formed with a single nibbler assembly.

A control system can be simplified since the stroke length of punch 1 is substantially constant in all punching strokes. Also, a smaller overlap margin can be achieved between the successive holes along the feed direction A, compared with a conventional nibbler assembly having a slant cutter blade section mentioned above, thereby resulting in improved process efficiency. Also, as compared with nibbler assemblies described in Japanese Patent Nos. 3401908 and 3960066, a simplified construction can be realized and therefore can be manufactured with low cost.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A nibbler assembly for a punch press, the nibbler assembly being operable to punch in a sheet material successive holes that at least partially overlap with each other along a feed direction in which the sheet material is fed from an upstream to a downstream in the feed direction so as to form an elongated hole in the sheet material, the nibbler assembly comprising:
   a die including a through opening formed therein, the through opening having an oblong configuration as viewed along a vertical direction, the die including an upper surface including a recess extending from an upper peripheral portion of the through opening at an upstream side of the feed direction towards the upstream of the feed direction, the recess being dented downwardly relative to other portions of the upper surface and defining an upper peripheral portion of the through opening at the upstream side of the feed direction, the upper peripheral portion of the through opening at the upstream side of the feed direction being lower than an upper peripheral portion of the through opening at a downstream side of the feed direction; and
   a punch including a blade substantially matching in shape with the through opening and configured to enter the through opening, the blade including an upstream end portion in the feed direction provided with opposite corners each having an arcuate shape as viewed along the vertical direction, the upstream end portion in the feed direction cooperating with the upper peripheral portion of the die to punch an upstream portion of the sheet material.

2. The nibbler assembly as claimed in claim 1, wherein the punch includes a segment to form an overlapped portion between the successive punched holes and at least the segment has a shape such that a width dimension in a direction perpendicular or substantially perpendicular to the feed direction decreases towards the downstream of the feed direction.

3. A method of forming an elongated hole in a sheet material, comprising the steps of:
   providing a die and a punch, the die including a through opening formed therein, the through opening having an oblong configuration as viewed along a vertical direction, the die including an upper surface formed with a recess extending from an upper peripheral portion of the through opening at an upstream side of the feed direction towards the upstream of the feed direction, the recess being dented downwardly relative to other portions of the upper surface and defining an upper peripheral portion of the through opening at the upstream side of the feed direction, the upper peripheral portion of the through opening at the upstream side of the feed direction being lower than an upper peripheral portion of the through opening at a downstream side of the feed direction, and the punch including a blade substantially matching in shape with the through opening and configured to enter the through opening, the blade including an upstream end portion in the feed direction provided with opposite corners each having an arcuate shape as viewed along the vertical direction, the upstream end portion in the feed direction cooperating with the upper peripheral portion of the die to punch an upstream portion of the sheet material; and
   driving the punch to punch in the sheet material successive holes such that the successive holes at least partially overlap with each other along the feed direction so as to perform a nibbling operation that forms the elongated hole in the sheet material.

* * * * *